(12) United States Patent
Crispin et al.

(10) Patent No.: US 11,675,252 B2
(45) Date of Patent: Jun. 13, 2023

(54) INTERFACE FACILITY

(71) Applicant: Leupold & Stevens, Inc., Beaverton, OR (US)

(72) Inventors: Quint Dean Crispin, Beaverton, OR (US); Timothy J. Lesser, Sherwood, OR (US); Zachary Matthew Bird, Forest Grove, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 894 days.

(21) Appl. No.: 16/505,582

(22) Filed: Jul. 8, 2019

(65) Prior Publication Data
US 2020/0019042 A1    Jan. 16, 2020

Related U.S. Application Data

(60) Provisional application No. 62/698,319, filed on Jul. 16, 2018.

(51) Int. Cl.
*G03B 17/14* (2021.01)
*G03B 17/48* (2021.01)
(Continued)

(52) U.S. Cl.
CPC ............ *G03B 17/14* (2013.01); *G03B 17/565* (2013.01); *G02B 21/0008* (2013.01); *G02B 23/16* (2013.01); *G03B 17/48* (2013.01)

(58) Field of Classification Search
CPC ...... G03B 17/14; G03B 17/48; G03B 17/565; G03B 17/566; A45C 2011/003;
(Continued)

(56) References Cited

U.S. PATENT DOCUMENTS 4,523,818 A * 6/1985 Lang .................... G02B 25/001
                                                          359/600
9,122,131 B2    9/2015 Coppage
(Continued)

FOREIGN PATENT DOCUMENTS

FR    3107965 A1    9/2021
JP    6990368 B1    12/2021
(Continued)

OTHER PUBLICATIONS

Marc Barros, "The Designing of the Moment Photo Case," https://www.shopmoment.com/momentist/the-designing-of-the-moment-photo-case, Mar. 5, 2017, Accessed May 8, 2019.
(Continued)

*Primary Examiner* — Christopher E Mahoney
(74) *Attorney, Agent, or Firm* — Schwabe, Williamson & Wyatt, P.C.

(57) ABSTRACT

An interface facility has a first facility element connected to an ocular, a device case configured to connect to a smart device, a second facility element connected to the device case, the first and second facility elements being configured to connect to each other in a connected condition and to detach from each other, the first facility element being registered with a first optical axis associated with the ocular, the second facility element being registered with a second optical axis associated with the camera, the first and second optical axes being registered with each other when the first and second facility elements are in the connected condition, such that the camera records images generated by the ocular. The first and second facility elements may comprise a bayonet mount.

20 Claims, 15 Drawing Sheets

(51) Int. Cl.
*G03B 17/56* (2021.01)
*G02B 21/00* (2006.01)
*G02B 23/16* (2006.01)

(58) Field of Classification Search
CPC ............ A45C 2011/002; H04N 5/2252; G02B 21/0008; G02B 23/16
See application file for complete search history.

(56) References Cited

U.S. PATENT DOCUMENTS

| | | | |
|---|---|---|---|
| 9,191,562 B1 | 11/2015 | Schorr, II | |
| 10,215,212 B2 | 2/2019 | Hyers | |
| 10,348,946 B2* | 7/2019 | Barros | A45C 11/00 |
| 10,877,296 B2 | 12/2020 | Lindsey | |
| 10,945,673 B2 | 3/2021 | Lozano-Buhl | |
| 2003/0025993 A1* | 2/2003 | Crista | G02B 7/12 |
| | | | 359/410 |
| 2015/0362828 A1* | 12/2015 | Patel | A61B 1/0661 |
| | | | 348/75 |
| 2017/0086650 A1 | 3/2017 | Valika | |
| 2018/0259118 A1 | 9/2018 | Shen | |
| 2019/0141221 A1* | 5/2019 | Barros | G03B 17/565 |
| 2020/0019042 A1 | 1/2020 | Crispin | |
| 2020/0028995 A1* | 1/2020 | Jain | H04N 5/2252 |
| 2020/0116298 A1 | 4/2020 | Senatorov | |
| 2021/0067616 A1* | 3/2021 | Penfold | G03B 17/561 |

FOREIGN PATENT DOCUMENTS

| | | | |
|---|---|---|---|
| KR | 200470461 Y1 | 12/2013 | |
| KR | 20150021874 A * | 3/2015 | .......... G02B 21/362 |
| WO | 2017/064336 A1 | 4/2017 | |

OTHER PUBLICATIONS

Carson, "HOOKUPZ 2.0—Smartphone Optics Adapter," https://www.carson.com/hookupz2/, Accessed May 8, 2019.
Elk Network "Gear 101 First Look—Hands on with the New Magview Spotting Scope Adapter" Jun. 30, 2022 <https://www.rmef.org/elk-network/category/gear-101/>; 8 pages.

* cited by examiner

INTERFACE FACILITY

CROSS-REFERENCE TO RELATED APPLICATION

This application claims the benefit of U.S. Provisional Patent Application No. 62/698,319 filed on Jul. 16, 2018, entitled "INTEGRAL EYEPIECE ADAPTER," which is hereby incorporated by reference in its entirety for all that is taught and disclosed therein.

FIELD OF THE INVENTION

The present invention relates to the attachment of external optics to mobile phones and, more particularly, to a phone case and eyepiece system that enables an optical device, such as binoculars, telescopes, and microscopes to be attached to a mobile phone such that the mobile phone's camera can take pictures through the lenses of the optical device.

BACKGROUND OF THE INVENTION

Mobile phone cameras are widely used for photography, partially because the quality of their cameras continues to improve. However, mobile phone cameras still have limitations compared to conventional DSLR cameras because of the limited quantities and types of lenses that are built-in to existing mobile phone cameras. Add-on external lenses that mimic the capabilities of interchangeable lenses for DSLR cameras have become increasingly popular. Some versions clip on an external lens to the exterior of the mobile phone, and others rely on a bayonet-style mount to connect an external lens to a dedicated mobile phone case.

Bayonet-style mounts are used to attach interchangeable lenses to modern DSLR cameras because the bayonet mechanism precisely aligns mechanical and electrical features between the lens and the camera body. Bayonet-style mounts usually have three to four tabs around the base of the lens that are received by recesses in the lens mounting plate on the front of the camera body. The tabs are often identified in some way to ensure that the lens is only inserted in one orientation, often by making one tab a different size or by marking a section of the lens and a section of the camera body. Once the tabs are inserted into the recesses, the lens is fastened by rotating the lens until the lens is locked into place. The lens is retained in place by a spring-loaded pin, which is operated to remove the lens.

There is also a desire to connect mobile phones to optical devices so the mobile phone's camera can take pictures through the optical device. Various systems have been developed that enable a mobile phone to be attached to the eyepiece of binoculars, telescopes, microscopes, and other optical devices.

Existing eyepiece designs allow extension of the eyecup according to user preference for eye relief. This function is also desirable when taking pictures with a mobile phone camera because it allows optimization of the axial distance between the mobile phone camera and the eyepiece lens. However, the conventional method for extending eyecups is via rotation of the eyecup. This approach is suitable when a user is simply pressing the eyecup against their face, but a mobile phone hanging off to one side of the eyecup either rotates the eyecup further than desired or rotates it back to a retracted state.

Therefore, a need exists for a new and improved interface facility that includes a telescoping eyecup with a locking feature that prevents undesirable axial movements of the eyecup. In this regard, the various embodiments of the present invention substantially fulfill at least some of these needs. In this respect, the interface facility according to the present invention substantially departs from the conventional concepts and designs of the prior art, and in doing so provides an apparatus primarily developed for the purpose of enabling the user to optimize the axial distance between the mobile phone camera and the eyepiece lens and to releasably secure the eyecup in the desired axial position.

SUMMARY OF THE INVENTION

The present invention provides an improved interface facility, and overcomes the above-mentioned disadvantages and drawbacks of the prior art. As such, the general purpose of the present invention, which will be described subsequently in greater detail, is to provide an improved interface facility with multiple aiming marks that has all the advantages of the prior art mentioned above.

To attain this, the preferred embodiment of the present invention essentially comprises a first facility element connected to an ocular, a device case configured to connect to a smart device, a second facility element connected to the device case, the first and second facility elements being configured to connect to each other in a connected condition and to detach from each other, the first facility element being registered with a first optical axis associated with the ocular, the second facility element being registered with a second optical axis associated with the camera, the first and second optical axes being registered with each other when the first and second facility elements are in the connected condition, such that the camera records images generated by the ocular. The first and second facility elements may comprise a bayonet mount. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

Figure 1:
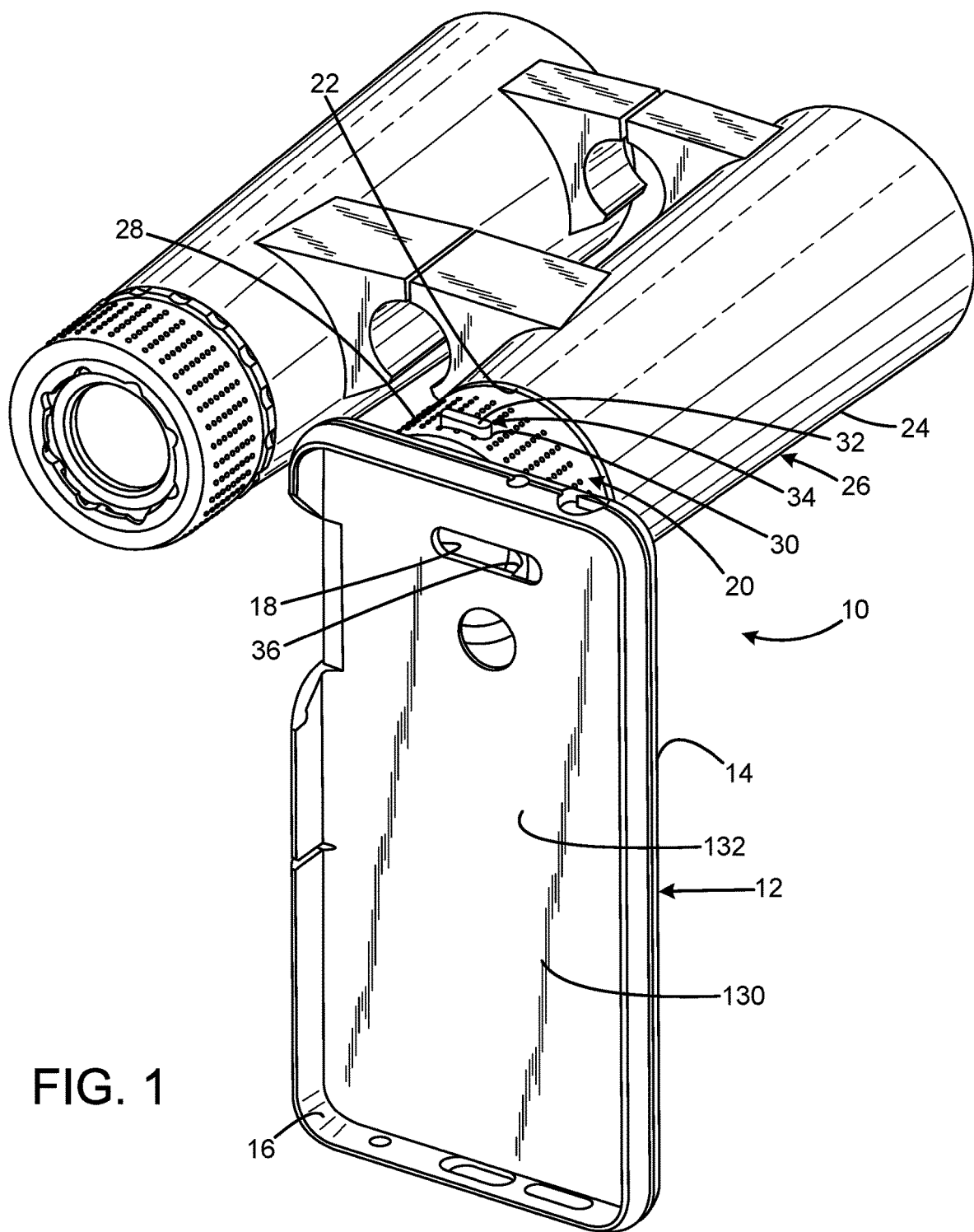
FIG. 1 is a top isometric view of the current embodiment of the interface facility constructed in accordance with the principles of the present invention attached to an optic.

An embodiment of the interface facility of the present invention is shown and generally designated by the reference numeral 10.

FIG. 1 illustrates the improved interface facility 10 of the present invention. More particularly, the interface facility 10 has a device case 12 having a front 14 and defining a rear recess 16. The case includes various features, cutouts, and apertures to accommodate features on a mobile phone/smart device (not shown) removably received by/connected to the rear recess. These include a camera aperture 18 that is axially registered with at least one camera aperture (not shown) associated with a camera present on a mobile phone removably received by the rear recess.

The interface facility 10 also includes an eyecup assembly 20 that is attached to the rear 22 of a housing 24 of an optic/ocular 26. In the current embodiment, the optic is a pair of binoculars, but the optic can also be any suitable telescopic or microscopic optical device. The eyecup assembly includes an eyecup 28 that defines a top button aperture 30. The button end 32 of a top locking lever 34 protrudes from the top button aperture. The eyecup assembly also includes a bayonet receptacle/first facility element 36 that enables the eyecup assembly to be releasably secured to the front 14 of the case 12 in a manner to be described subsequently. The optic includes an eyepiece lens 136, and the bayonet receptacle defines an aperture encompassing the eyepiece lens.

Figure 2:
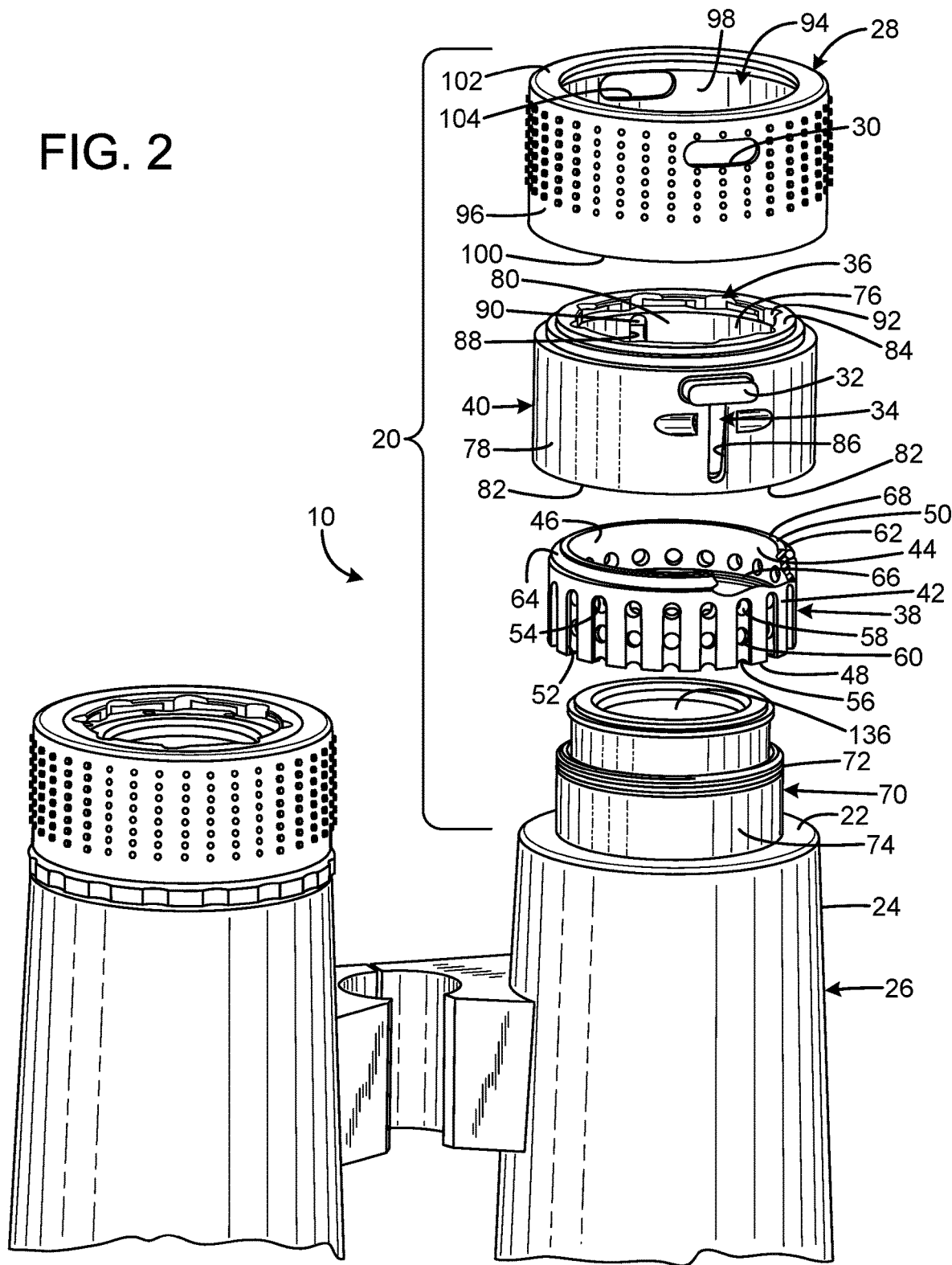
FIG. 2 is a front exploded view of the current embodiment of the eyecup assembly of FIG. 1.

FIG. 2 illustrates the improved eyecup assembly 20 of the present invention. More particularly, the eyecup assembly 20 has an inner ring 38, an outer ring 40 that encircles the inner ring, and the eyecup 28 that encircles the outer ring. The inner ring has an exterior 42, an interior 44, and defines a central bore 46. The inner ring also has a front 48 and a rear 50. The exterior of the inner ring defines a plurality of axial slots 52. Each axial slot has a rounded rear wall 54 and a forward scalloped portion 56. Each axial slot includes a rear hole 58 and a front hole 60. The rear of the inner ring defines an O-ring groove 62 that receives an O-ring 64. The interior of the inner ring defines interior threads 66 that terminate in a rear shoulder 68.

The inner ring 38 releasably secures the eyecup assembly 20 to an eyepiece 70 that extends rearwardly from the rear 22 of the housing 24 of the optic 26. This is accomplished by threadedly engaging the interior threads 66 of the inner ring with exterior threads 72 on the exterior 74 of the eyepiece. The rear shoulder 68 of the inner ring provides a stop indicating when the inner ring has been screwed on tight to the eyepiece.

The outer ring 40 defines a central bore 76 that receives the inner ring 38. The outer ring also has an exterior 78, an interior 80, a front 82, and a rear 84. The outer ring defines a top axial slot 86 and an opposed bottom axial slot 88. The top locking lever 34 is received in the top axial slot, and a bottom locking lever 90 is received in the bottom axial slot. The rear of the outer ring includes the bayonet receptacle 36 that defines a plurality of recesses 92.

The eyecup 28 defines a central bore 94 that receives the outer ring 40. The eyecup also has an exterior 96, an interior 98, a front 100, and a rear 102. The eyecup defines the top button aperture 30 and an opposed bottom button aperture 104. The button end 32 of the top locking lever 34 protrudes through the top button aperture. The button end 106 (shown in FIG. 3) of the bottom locking lever 90 protrudes through the bottom button aperture.

Figure 3:
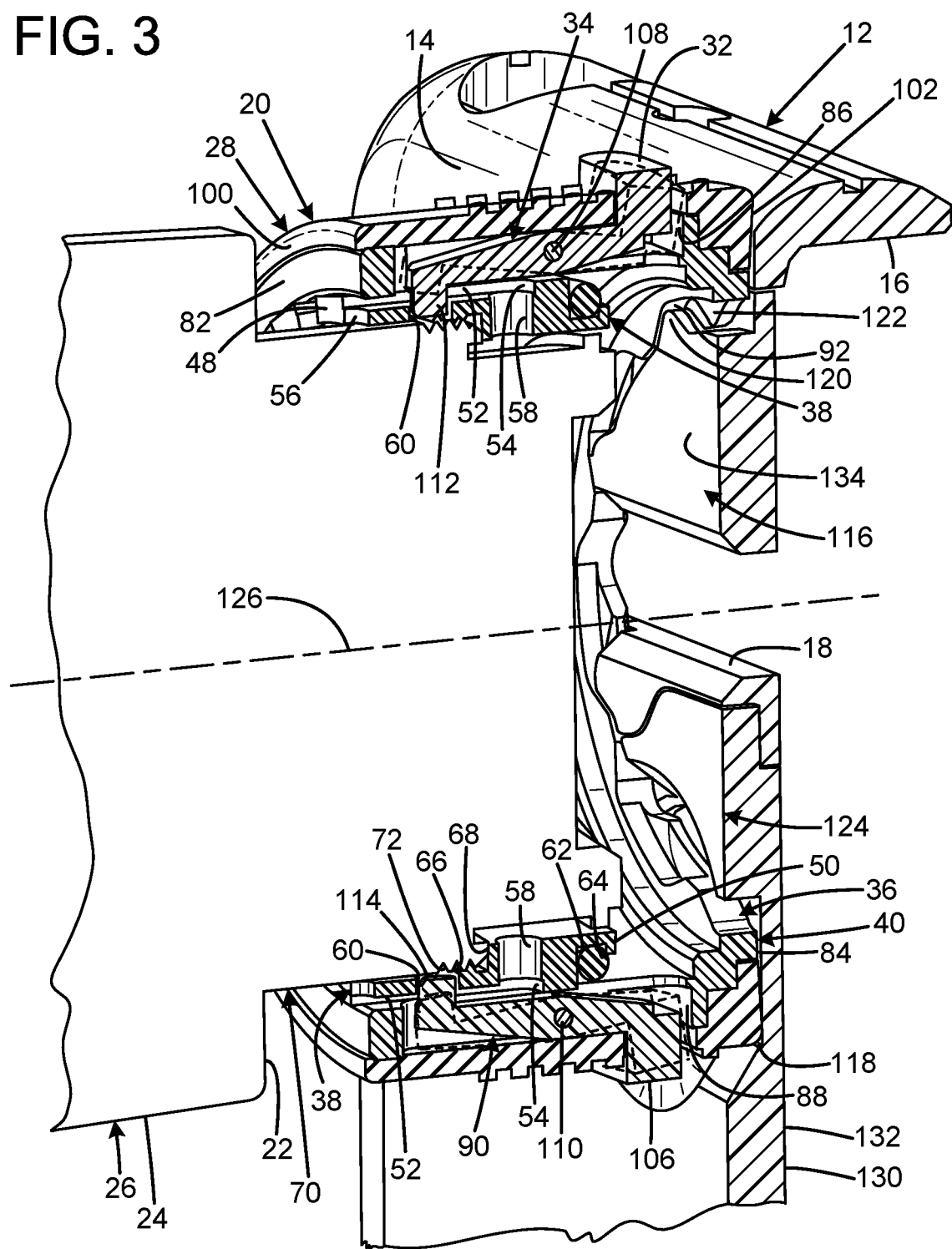
FIG. 3 is an isometric side sectional view of the current embodiment of the interface facility of FIG. 1 with the eyecup assembly releasably secured to the bayonet mount on the case and the eyecup assembly releasably locked in the intermediate extension axial position.
Figure 4:
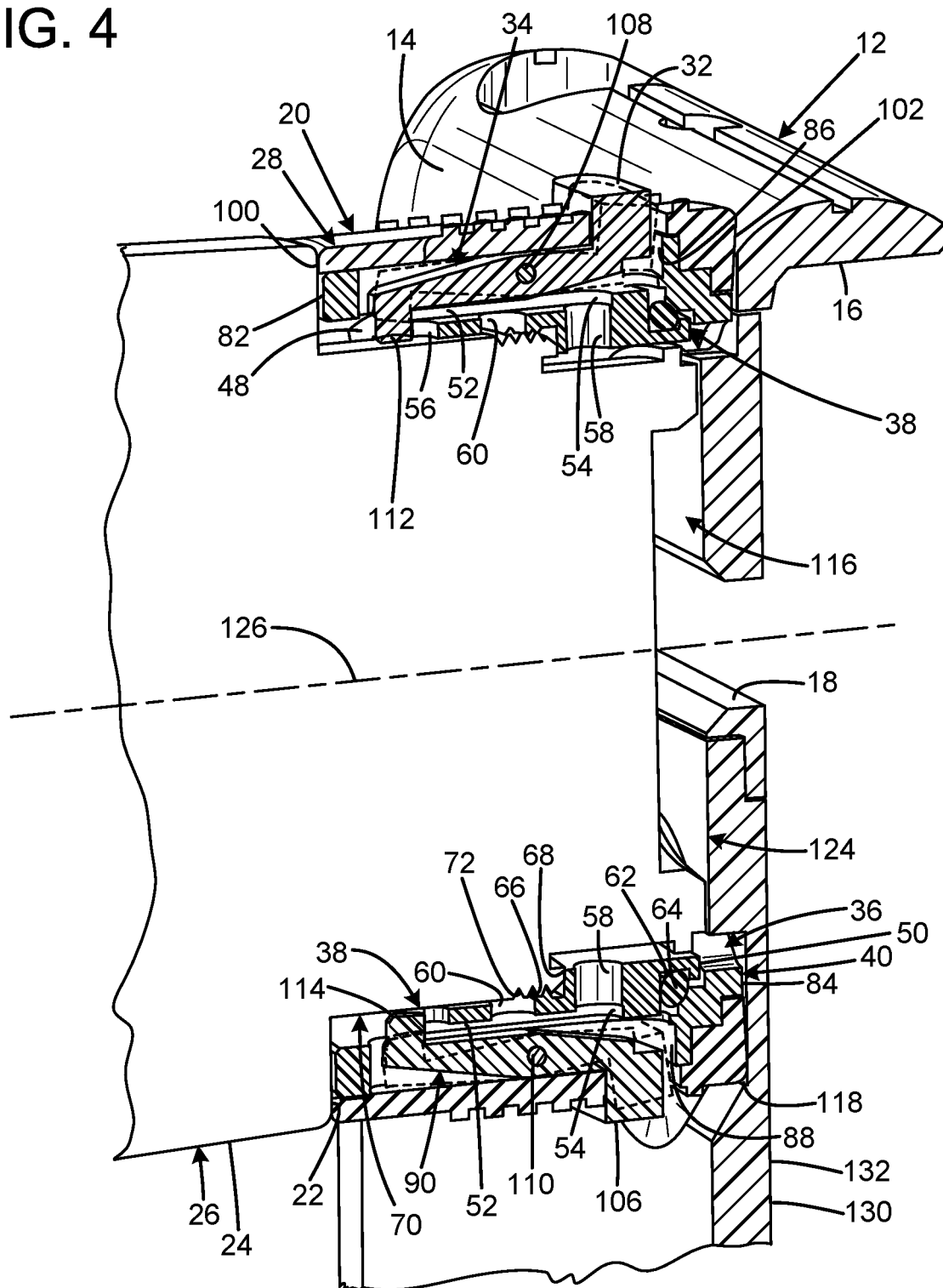
FIG. 4 is an isometric side sectional view of the current embodiment of the interface facility of FIG. 1 with the eyecup assembly releasably secured to the bayonet mount on the case and the eyecup assembly releasably locked in the least extension axial position.
Figure 5:
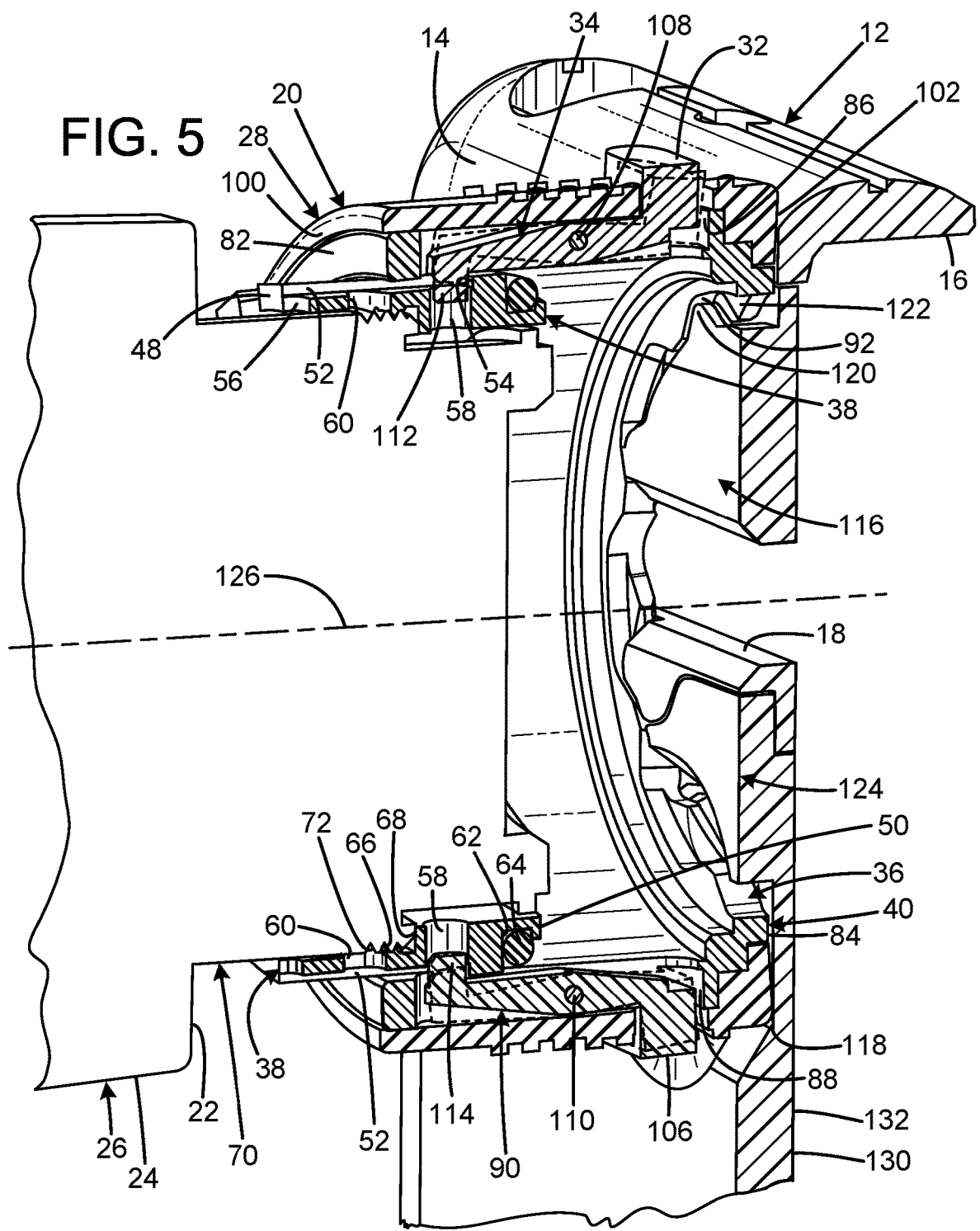
FIG. 5 is an isometric side sectional view of the current embodiment of the interface facility of FIG. 1 with the eyecup assembly in the locked position on the bayonet mount on the case and the eyecup assembly releasably locked in the maximum extension axial position.

FIGS. 3-5 illustrate the improved interface facility 10 of the present invention. More particularly, the eyecup assembly 20 has three positions of axial adjustment relative to the eyepiece 70 of the optic 26, which makes the eyecup assembly movable with respect to the optic. FIG. 3 shows the eyecup assembly releasably locked in the intermediate extension axial position. FIG. 4 shows the eyecup assembly releasably locked in the least extension/retracted axial position. FIG. 5 shows the eyecup assembly releasably locked in the maximum extension axial position. The top locking lever 34 and bottom locking lever 90 are pivotally mounted on pivot pins 108, 110 within the top axial slot 86 and the bottom axial slot 88. The top locking lever and bottom locking lever each have a locking end 112, 114 opposed to their button ends 32, 106. In the current embodiment, the top and bottom locking levers are spring biased to urge their locking ends inwards and their button ends outwards. In FIGS. 3-5, the dashed lines depict the top and bottom locking levers in their actuated positions, which enables the eyecup assembly to transition between the three positions of axial adjustment shown. The top and bottom locking levers serve as a latch having an engaged position and a disengaged position, and in which the eyecup assembly is axially movable with respect to the optic when in the disengaged position. Furthermore, the eyecup assembly has a plurality of axial positions ranging from a retracted position and an extended position. In addition, the eyecup assembly includes a latch facility (the top and bottom locking levers) that prevent rotation of the eyecup assembly except when in the retracted position.

In the intermediate extension axial position, the locking ends 112, 114 of the top and bottom locking levers 34, 90 are releasably received in two opposed front holes 60. In the least extension axial position, the locking ends of the top and bottom locking levers escape from the axial slots 52 and engage two opposed forward scalloped portions 56. Contact between the O-ring 64 and the underside of the rear 84 of the outer ring 40 limits forward travel of the locking ends of the top and bottom locking levers. Rotation of the outer ring 40 relative to the inner ring 38 is only permitted when the locking ends of the top and bottom locking levers have escaped from the axial slots. The forward scalloped portions provide a detent function to denote when the locking ends of the top and bottom locking levers have transitioned from one pair of opposed forward scalloped portions to an adjacent pair of opposed forward scalloped portions. It should be appreciated that the terminology "top and bottom locking levers" is intended merely to orient the reader relative to the drawings, and is not intended to be limiting given that the outer ring can be rotated clockwise or counterclockwise to any desired extent when the locking ends of the top and bottom locking levers have escaped from the axial slots in the least extension axial position. In the maximum extension axial position, the locking ends of the top and bottom locking levers are releasably received in two opposed rear holes 58. The rear walls 54 of the axial slots limit rearward travel of the locking ends of the top and bottom locking levers within the axial slots.

Figure 6:
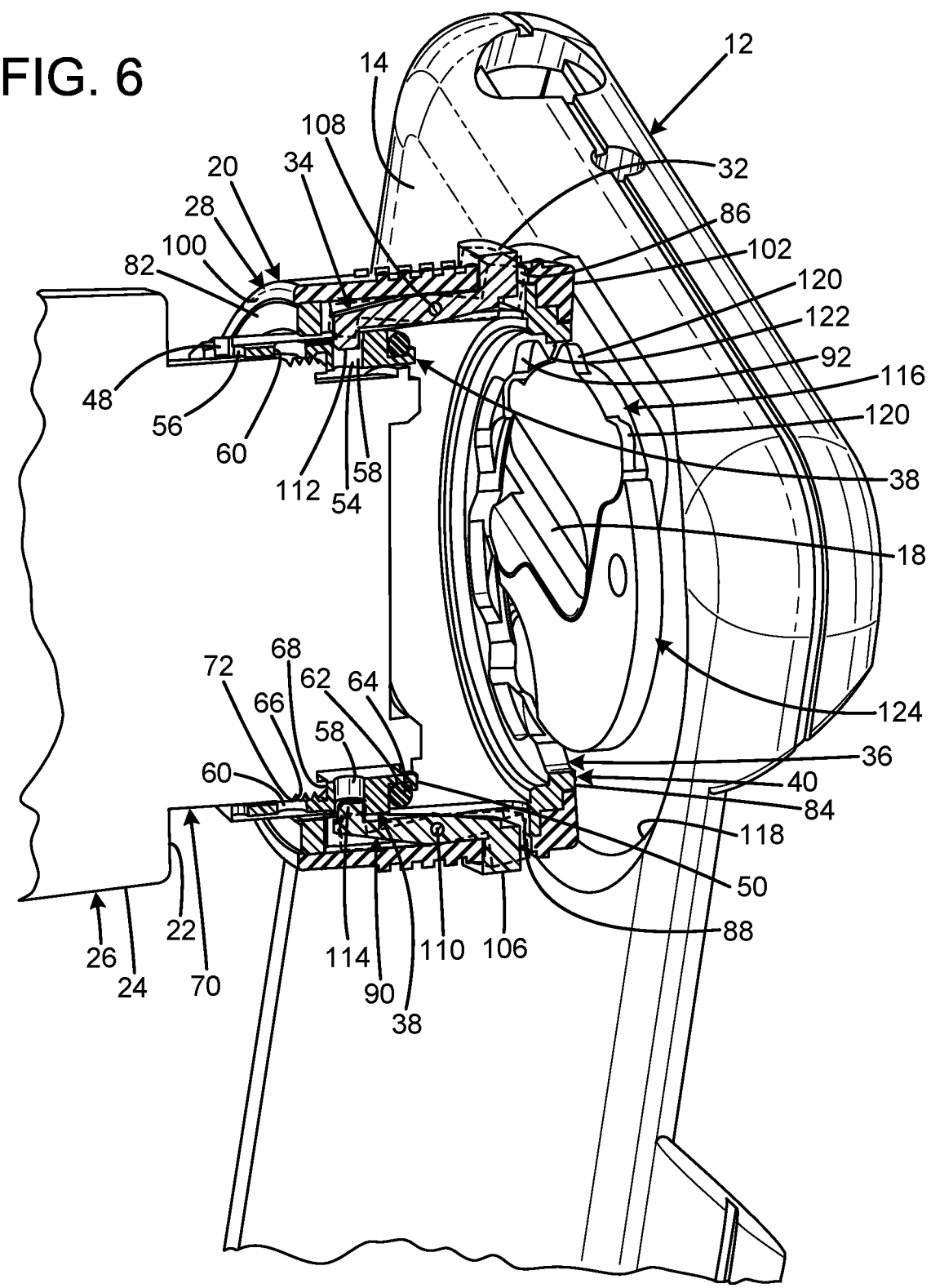
FIG. 6 is an isometric side sectional view of the current embodiment of the interface facility of FIG. 1 with the eyecup assembly in the released position on the bayonet mount on the case and the eyecup assembly releasably locked in the maximum extension axial position.
Figure 7:
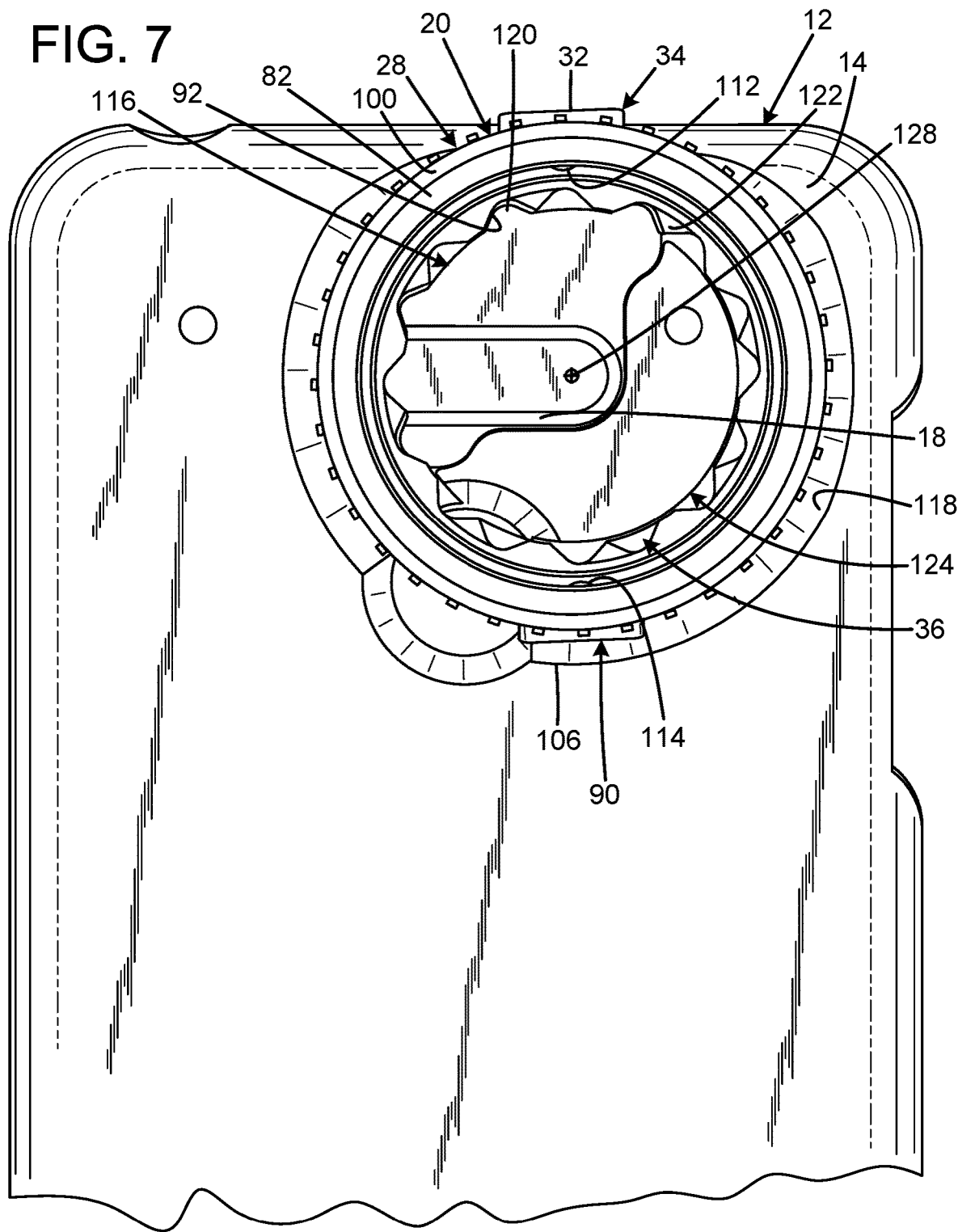
FIG. 7 is a front sectional view of the current embodiment of the interface facility of FIG. 1 with the eyecup assembly in the locked position on the bayonet mount on the case.
Figure 8:
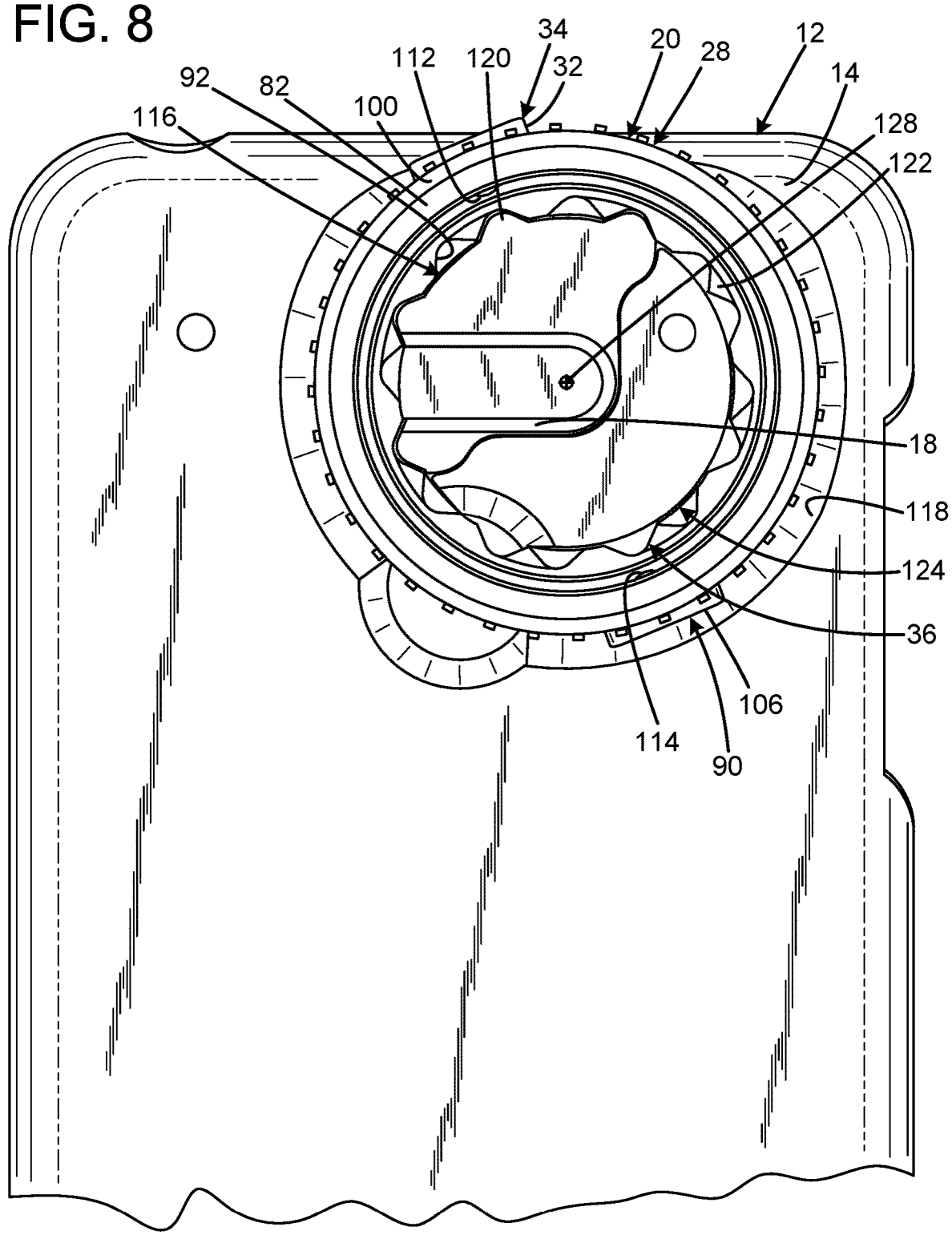
FIG. 8 is a front sectional view of the current embodiment of the interface facility of FIG. 1 with the eyecup assembly in the released position on the bayonet mount on the case.

FIGS. 3-5 & 7 illustrate the improved interface facility 10 of the present invention with the eyecup assembly 20 in the locked position on the front 14 of the case 12. FIGS. 6 & 8 illustrate the improved interface facility 10 of the present invention with the eyecup assembly 20 in the released position on the front 14 of the case 12. More particularly, the front of the case includes a bayonet insert/second facility element 116 and defines a circular recess 118. The case has a back panel 130 coextensive with the mobile phone, the back panel has an inner surface 132 overlaying the mobile phone, and an opposed outer surface 134, the inner and other surfaces each defining respective planes, the bayonet insert being entirely between the respective planes such that the bayonet insert does not protrude from the back panel or another portion of the case. When the bayonet receptacle 36 receives the bayonet insert 116 to releasably secure the eyecup assembly to the front of the case via a bayonet mount, the circular recess receives the rear 84 of the outer ring 40 and the rear 102 of the eyecup 28. Thus, the bayonet receptacle defines an aperture, and the bayonet insert includes a protrusion received in the aperture when the bayonet receptacle and bayonet insert are connected. It should be appreciated that the bayonet receptacle is registered with a first optical axis 126 associated with the optic, and the bayonet insert is registered with a second optical axis 128 associated with the camera. Furthermore, the first and second optical axes are registered with each other when the bayonet receptacle and the bayonet insert are in the connected condition, such that the camera records images generated by the optic. In addition, each of the bayonet receptacle and the bayonet insert includes an arcuate element concentric with the respective optical axis with which the bayonet receptacle and the bayonet insert are registered. In the current embodiment, the eyecup is made of an elastomeric material that is compressed against the front of the case by the rear of the outer ring within the circular recess and provides frictional resistance to rotation of the eyecup assembly relative to the front of the case. Thus, the optic includes a resilient rear surface element configured to compressively contact the bayonet receptacle when in the connected condition. Furthermore, the case defines a recessed annular channel (circular recess 118) encompassing the bayonet insert and configured to receive a rear portion of the optic. The bayonet insert includes a plurality of tabs 120 that are radially extending lugs sized to slide over corresponding step downs 122 defined by the bayonet receptacle and to be closely received by recesses/lug passages 92 defined by the bayonet receptacle and associated with the lugs. The aperture on the bayonet receptacle that encompasses the eyepiece lens 136 includes a circular opening with a plurality of peripheral opening extensions (recesses 92) configured to receive the plurality of lugs on the bayonet insert. The step downs provide frictional resistance to rotation of the eyecup assembly relative to the front of the case to releasably locked the eyecup assembly into a specified orientation relative to the camera aperture 18 defined by the case. The bayonet insert, which is made of metal and is the only metal part in the current embodiment, is reinforced by a reinforcement 124, which is made of plastic and is part of the case in the current embodiment. In the current embodiment, the bayonet receptacle has eight step downs and recesses, and the bayonet insert has four tabs.

The user can depress the button ends 32, 106 on the top and bottom locking levers 34, 90 to adjust the axial distance between the eyepiece 70 and the camera aperture on the mobile phone (not shown) releasably received in the rear recess 16 of the case 12 without having to worry about causing inadvertent rotation of the eyepiece 70 relative to the case. Rotation of the outer ring 40 relative to the inner ring 38 will only occur if the user first adjusts the top and bottom locking levers 34, 90 to the least extension axial position to free the locking ends 112, 114 from the axial slots 52 and subsequently supplies enough rotational force to transition the locking ends from one pair of opposed forward scalloped portions 56 to an adjacent pair of opposed forward scalloped portions.

Figure 9:
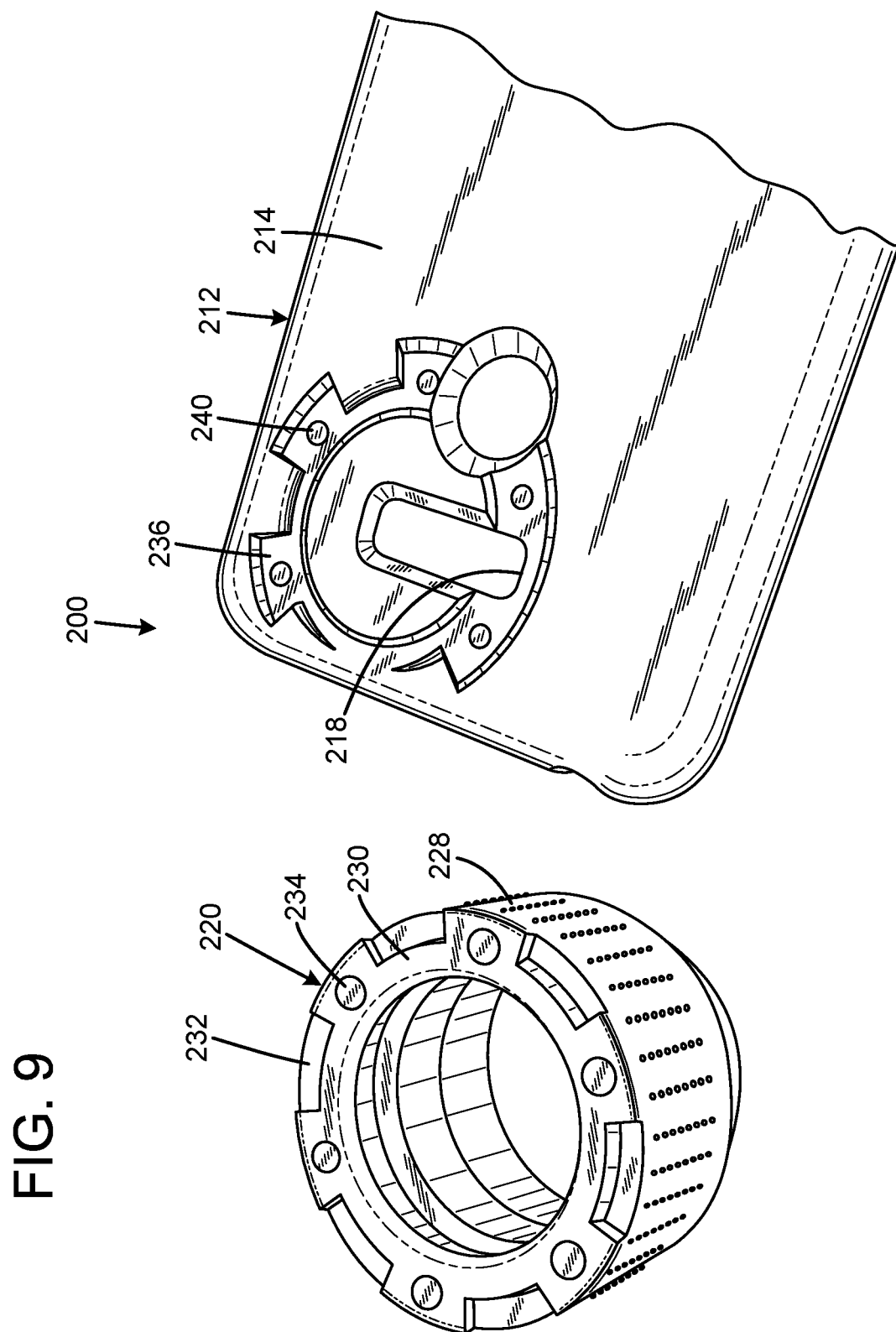
FIG. 9 is a front perspective view of a first alternative embodiment of the interface facility constructed in accordance with the principles of the present invention.
Figure 10:
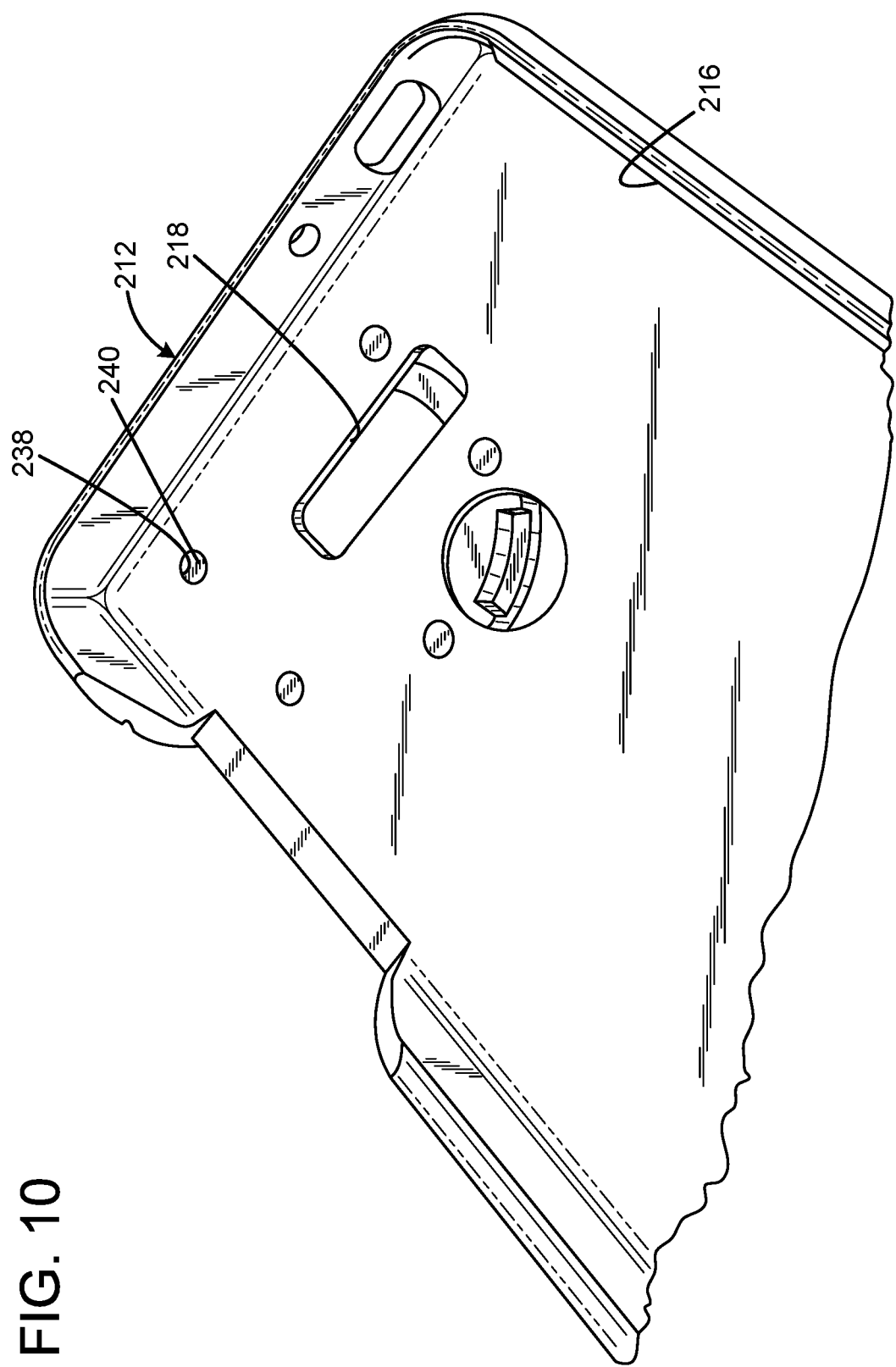
FIG. 10 is a rear perspective view of the first alternative embodiment of the case of FIG. 9.
Figure 11:
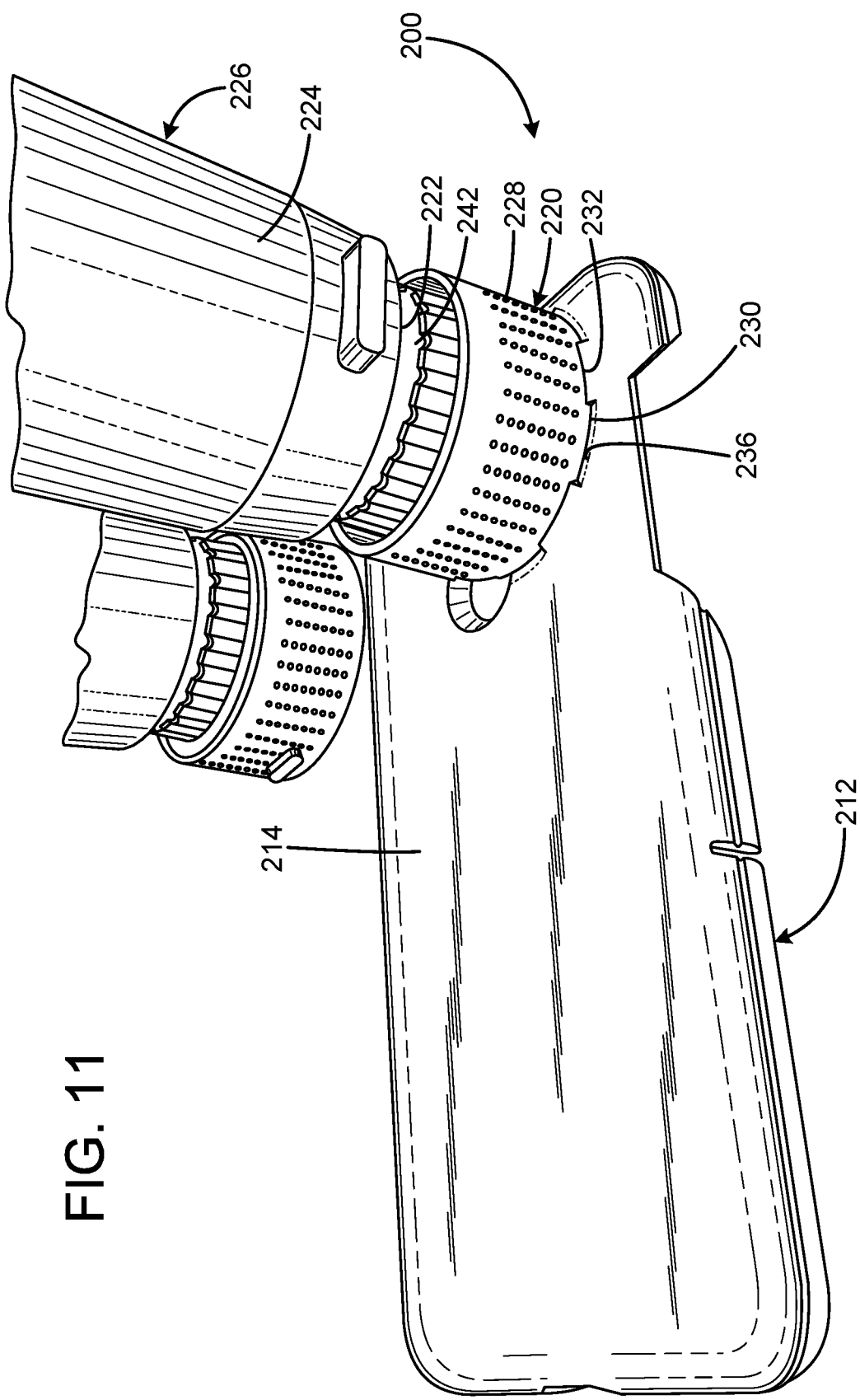
FIG. 11 is a front perspective view of the first alternative embodiment of FIG. 9 attached to an optic.

FIGS. 9-11 illustrate a first alternative embodiment of the improved interface facility 200 of the present invention. More particularly, the interface facility 200 has a case 212 having a front 214 and defining a rear recess 216. The case includes various features, cutouts, and apertures to accommodate features on a mobile phone (not shown) removably received by the rear recess. These include a camera aperture 218 that is axially registered with at least one camera aperture (not shown) present on a mobile phone removably received by the rear recess.

The interface facility 200 also includes an eyecup assembly 220 that is attached to the rear 222 of a housing 224 of an optic 226. In the current embodiment, the optic is a pair of binoculars, but the optic can also be any suitable telescopic or microscopic optical device. The eyecup assembly includes an eyecup 228 having a rear 230 that defines a plurality of recesses 232. A plurality of magnets 234 are captured within the rear of the eyecup between the recesses. The magnets enable the eyecup assembly to be releasably secured to the front 214 of the case 212 in a manner to be described subsequently.

The front 214 of the case 212 defines a plurality of recesses 236, and the rear recess of the case 216 defines a plurality of pockets 238 that are axially registered with the recesses. Each pocket receives a magnet 240. The eyecup assembly 220 is releasably secured to the front of the case by aligning magnets 234 in the eyecup 228 with the magnets in the case. Magnetic attraction between the two sets of magnets serves to hold the eyecup assembly on the front of the case. The recesses 232 on the eyecup and the recesses 236 on the front of the case are offset to serve as overlapping features to prevent rotation of the eyecup assembly relative to the case. It should be appreciated that the eyecup assembly 220 can include the features of the eyecup assembly 20 to enable the eyecup assembly 220 to have the same three positions of axial adjustment relative to the eyepiece 242 of the optic 226 as eyecup assembly 20. Furthermore, mechanical securing features can also be employed in addition to the magnetic attraction between the two sets of magnets.

Figure 12:
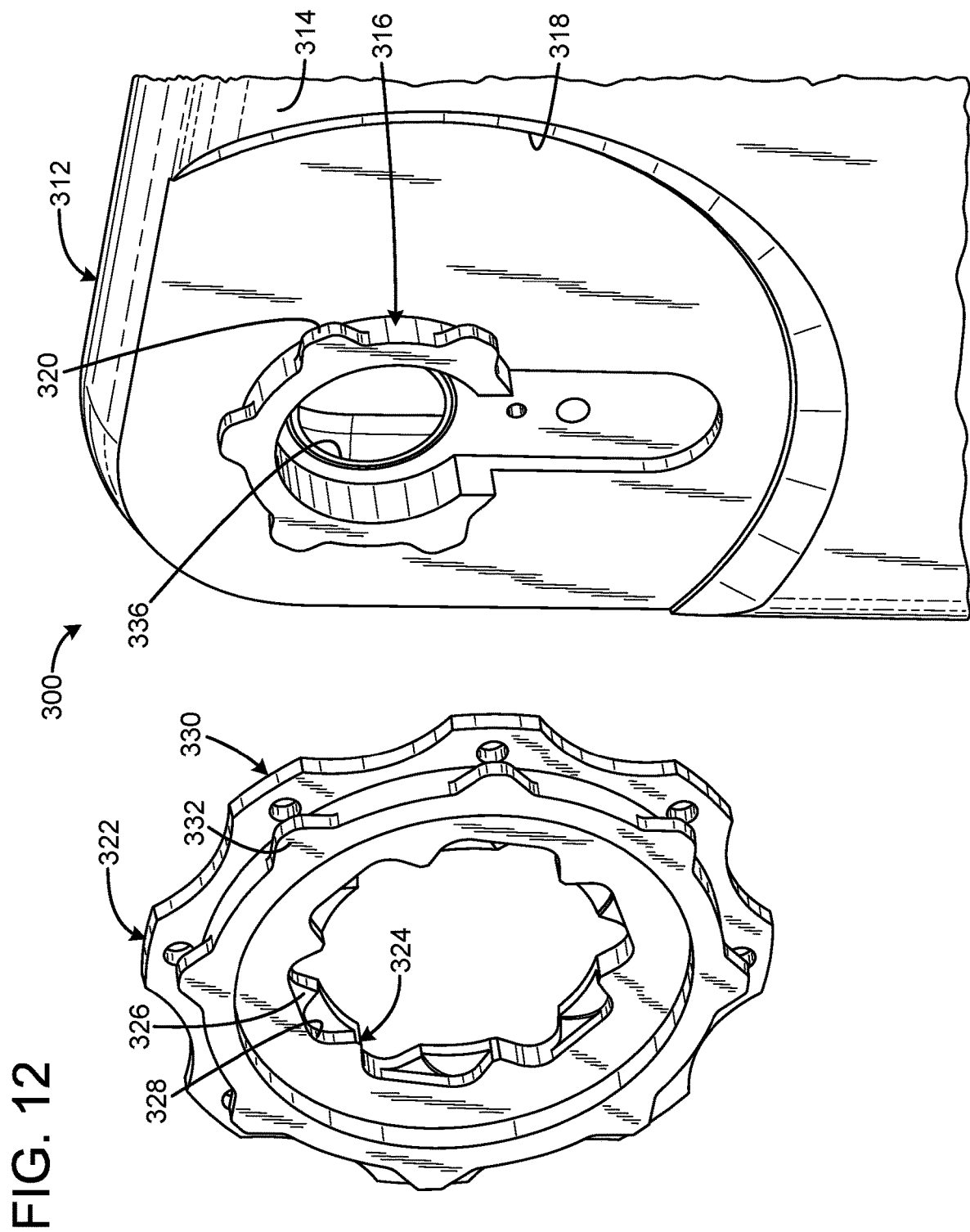
FIG. 12 is an exploded view of a second alternative embodiment of the interface facility constructed in accordance with the principles of the present invention.
Figure 13:
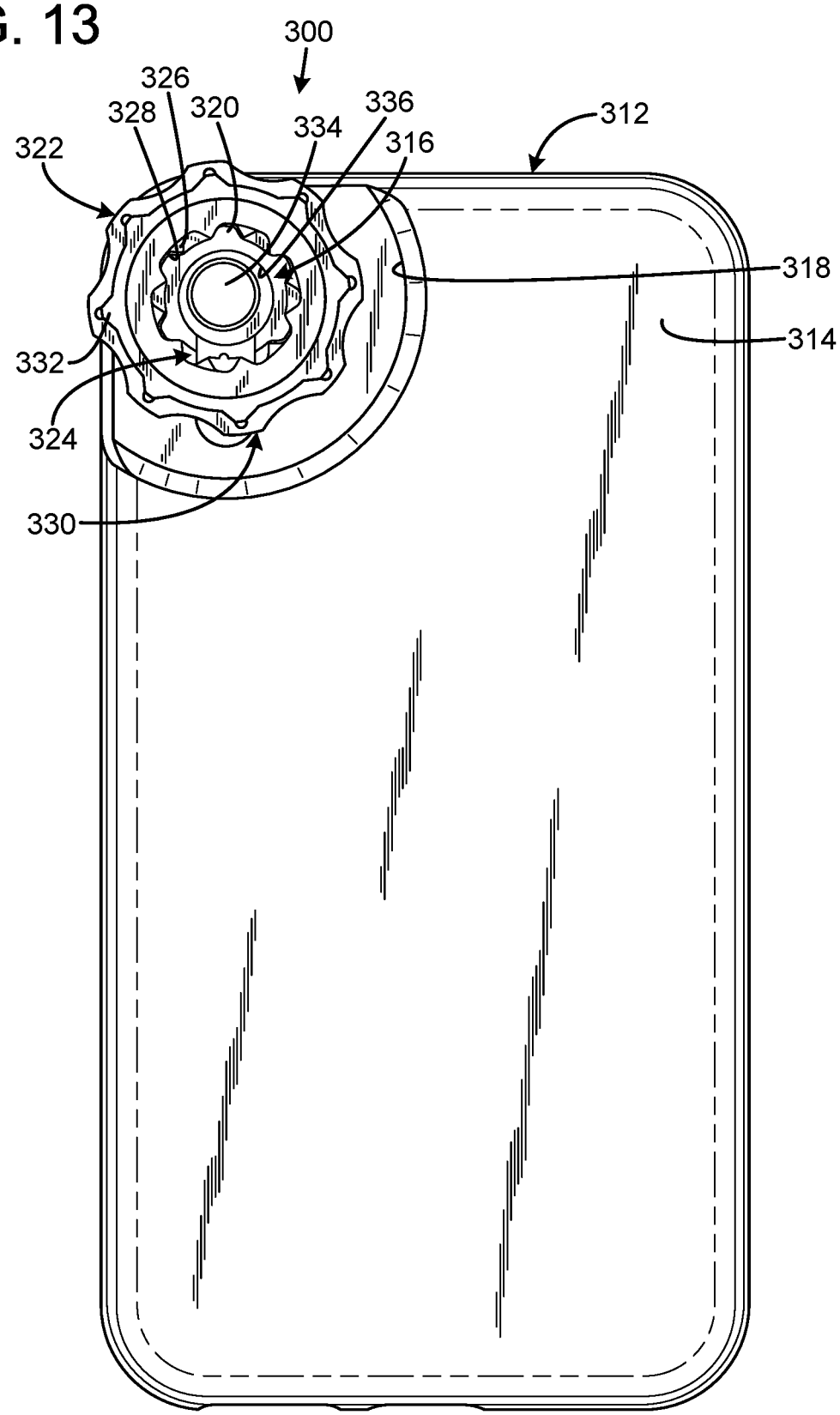
FIG. 13 is a front perspective view of the second alternative embodiment of FIG. 12.

FIGS. 12 & 13 illustrate a second alternative embodiment of the improved interface facility 300 of the present invention. More particularly, the interface facility 300 has a case 312 having a front 314 that defines a camera aperture 336. The front of the case includes a bayonet insert 316 and defines a circular recess 318. The circular recess is a recessed annular channel that extends off a peripheral edge of the case such that a mobile phone with a camera close to the device edge may be employed with an optic having a larger radius. The bayonet insert includes a plurality of tabs 320. A bayonet adapter 322 includes a bayonet receptacle 324 that receives the bayonet insert to releasably secure the bayonet adapter to the front of the case. The bayonet adapter is shown in the unlocked position in FIG. 12 and the locked position in FIG. 13. The tabs are sized to slide over corresponding step downs 326 defined by the bayonet receptacle and to be closely received by recesses 328 defined by the bayonet receptacle. The step downs provide frictional resistance to rotation of bayonet adapter relative to the front of the case to releasably lock the bayonet adapter into a specified orientation relative to the camera aperture defined by the case. In the current embodiment, the bayonet receptacle has 6 step downs and recesses, and the bayonet insert has 5 tabs.

The bayonet adapter 322 also includes a bayonet insert 330 having a plurality of tabs 332. The bayonet receptacle 36 receives the bayonet insert to releasably secure the eyecup assembly to the bayonet adapter, which in turn releasably secures the eyecup assembly to the front 314 of the case 312. The circular recess 318 receives the rear 84 of the outer ring 40 and the rear 102 of the eyecup 28. In the current embodiment, the bayonet insert has eight tabs. It should be appreciated the interface facility 300 is intended for use where the diameter of the bayonet insert is too large to not extend beyond the periphery of the case if the smartphone camera 334 received in the case is located near an edge of the case. The bayonet insert 316 and bayonet receptacle 324 could be replaced with a screw on mount or could utilize a suitable peel-and stick or glued attachment method.

Figure 14:
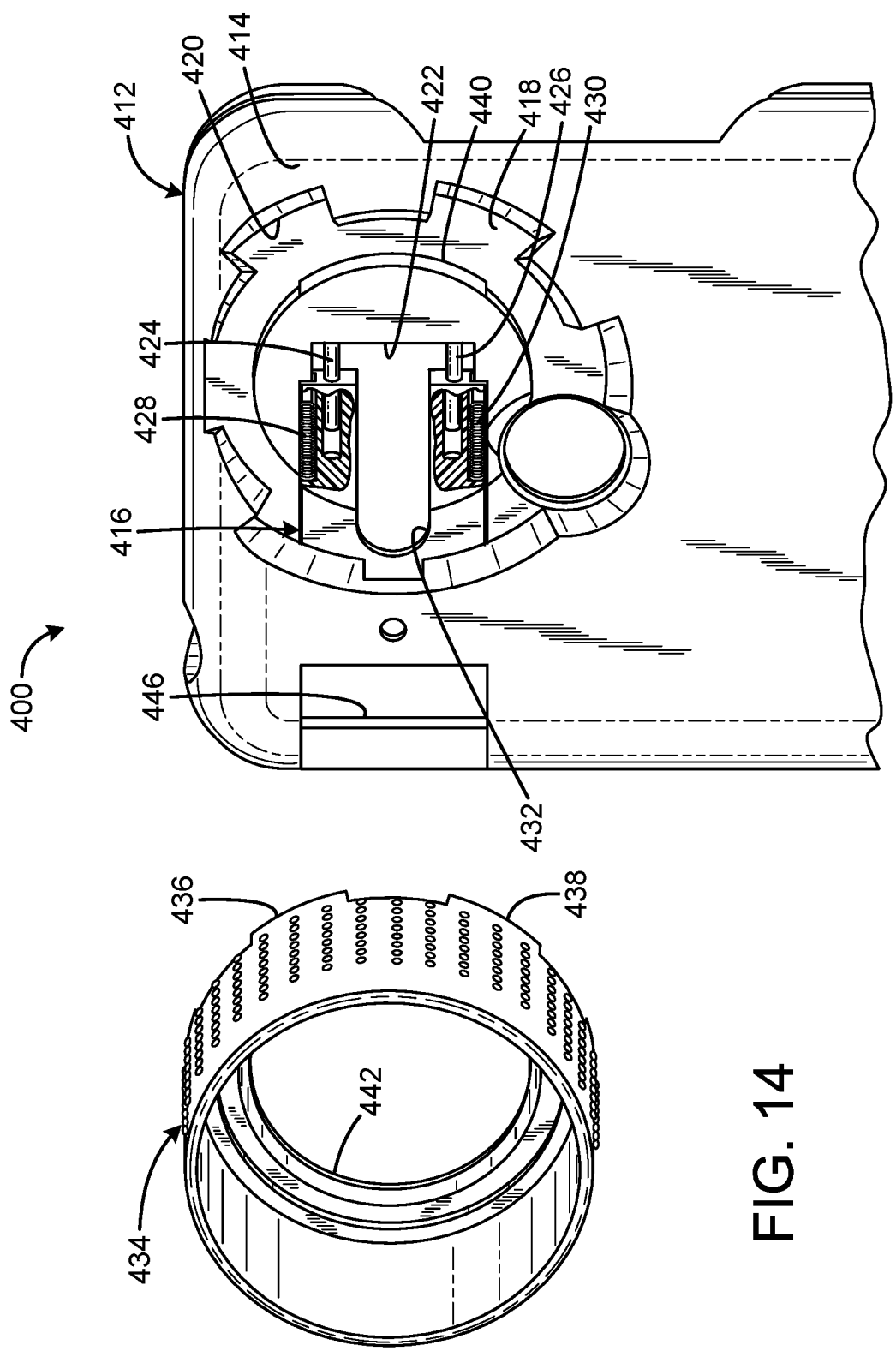
FIG. 14 is a front perspective view of a third alternative embodiment of the interface facility constructed in accordance with the principles of the present invention.
Figure 15:
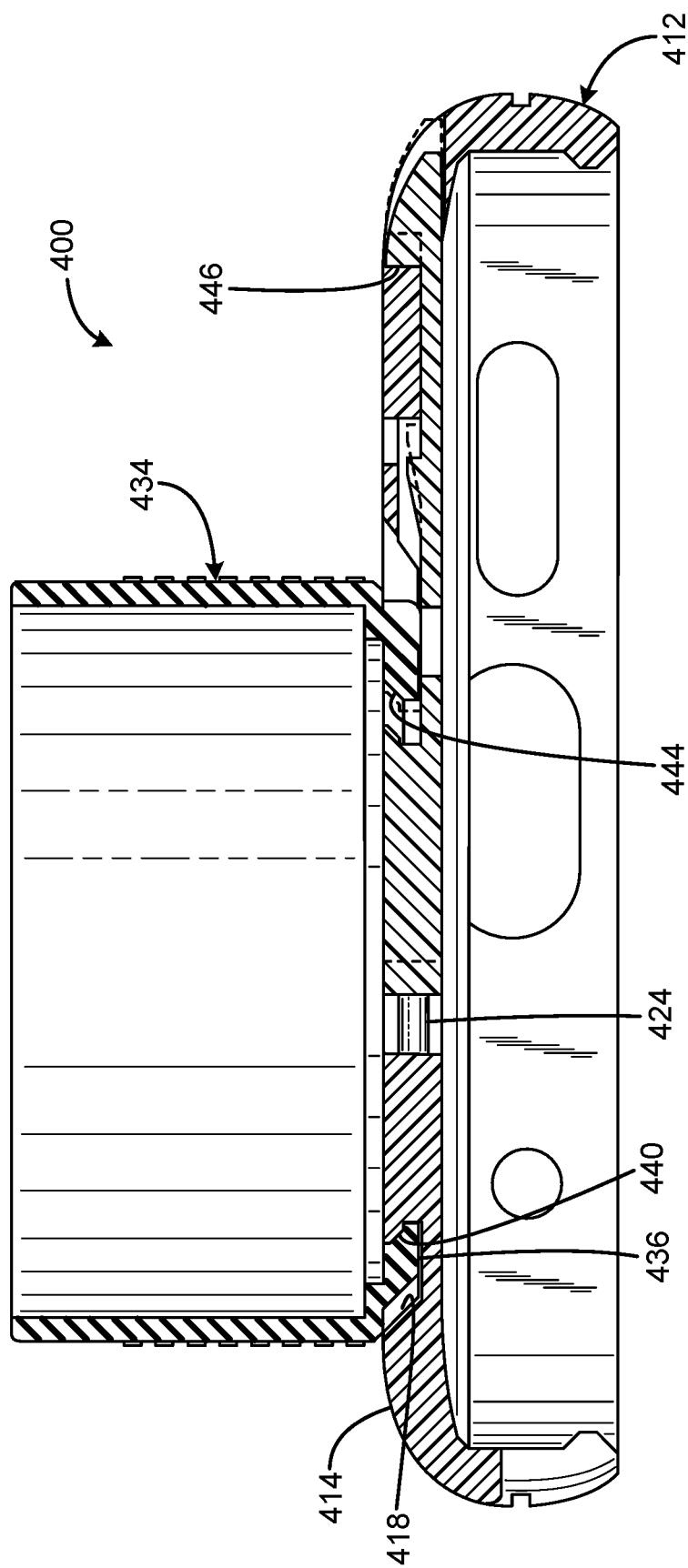
FIG. 15 is a top sectional view of the third alternative embodiment of FIG. 14.

FIGS. 14 & 15 illustrate a third alternative embodiment of the improved interface facility 400 of the present invention. More particularly, the interface facility 400 has a case 412 having a front 414. The case includes a spring button latch 416 that is shown in the unlocked position in solid lines in FIG. 15 and in the locked position in dashed lines in FIG. 15. The front of the case defines a circular recess 418 that includes a plurality of notches 420. The front of the case also defines a camera aperture 422. The spring button latch is mounted on an upper guide rod 424 and a lower guide rod 426 so the spring button latch will reciprocate laterally across the front of the case. An upper coil spring 428 and a lower coil spring 430 bias the spring button latch outwards relative to the periphery of the case to the locked position. The spring button latch includes a U-shaped camera notch 432 on one end so the latch will not obstruct a smartphone camera received by the case. The spring button latch includes a finger insert 446 on an opposed end so a user can overcome the upper and lower coil springs to translate the spring button latch to the unlocked position.

The spring button latch 416 releasably secures an eyecup 434 having a rear 436 to the front 414 of the case 412. The notches 420 closely receive downward protrusions 438 on the rear of the eyecup to prevent rotation of the eyecup relative to the front of the case. An undercut 440 defined by the front of the case is in communication with the circular recess 418. A bottom portion 442 of the eyecup is releasably captured by the undercut. The spring button latch includes an undercut 444 that also releasably captures the bottom portion of the eyecup when the spring button latch is in the locked position. When the spring button latch is in the locked position, the undercuts prevent the bottom portion of the eyecup from disengaging from the circular recess. When the spring button latch is held by the user in the unlocked position, the spring button latch undercut 444 is disengaged from the bottom portion of the eyecup, and the user can disengage the bottom portion of the eyecup from the case undercut 440.

While current embodiments of an interface facility have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An interface facility for connecting an ocular and a smart device having a camera, the interface facility comprising:
    a first facility element connected to the ocular, wherein the ocular includes an eyepiece lens, and wherein the first facility element defines an aperture encompassing the eyepiece lens;
    a device case configured to connect to the smart device; and
    a second facility element connected to the device case, wherein the device case has a back panel and wherein the second facility element does not protrude from the back panel;
    the first and second facility elements being configured to connect to each other in a connected condition and to detach from each other;
    the first facility element being registered with a first optical axis associated with the ocular;
    the second facility element being registered with a second optical axis associated with the camera; and
    the first and second optical axes being registered with each other when the first and second facility elements are in the connected condition, such that the camera records images generated by the ocular.

2. The interface facility of claim 1 wherein the first and second facility elements comprise a bayonet mount.

3. The interface facility of claim 1 wherein each of the first and second facility elements includes an arcuate element concentric with the respective optical axis with which the first and second facility elements are registered.

4. The interface facility of claim 1 wherein the first facility element defines an aperture, and wherein the second facility element includes a protrusion received in the aperture when the first and second facility elements are connected.

5. The interface facility of claim 4 wherein the protrusion includes a plurality of radially extending lugs, and wherein the first facility element aperture includes lug passages associated with the lugs.

6. The interface facility of claim 1 wherein the aperture includes a circular opening with a plurality of peripheral opening extensions configured to receive a plurality of lugs on the second facility element.

7. An interface facility for connecting an ocular and a smart device having a camera, the interface facility comprising:
   a first facility element connected to the ocular, wherein the first facility element includes an eyecup movable with respect to the ocular;
   a device case configured to connect to the smart device; and
   a second facility element connected to the device case;
   the first and second facility elements being configured to connect to each other in a connected condition and to detach from each other;
   the first facility element being registered with a first optical axis associated with the ocular;
   the second facility element being registered with a second optical axis associated with the camera; and
   the first and second optical axes being registered with each other when the first and second facility elements are in the connected condition, such that the camera records images generated by the ocular;
   wherein the device case has a back panel coextensive with the smart device, the back panel has an inner surface overlaying the smart device, and an opposed outer surface, the inner and outer surfaces each defining respective planes, the second facility element being entirely between the respective planes such that the second facility element does not protrude from the device case.

8. An interface facility for connecting an ocular and a smart device having a camera, the interface facility comprising:
   a first facility element connected to the ocular;
   a device case configured to connect to the smart device; and
   a second facility element connected to the device case;
   the first and second facility elements being configured to connect to each other in a connected condition and to detach from each other;
   the first facility element being registered with a first optical axis associated with the ocular;
   the second facility element being registered with a second optical axis associated with the camera; and
   the first and second optical axes being registered with each other when the first and second facility elements are in the connected condition, such that the camera records images generated by the ocular;
   wherein the ocular includes a resilient rear surface element configured to compressively contact the second facility element when in the connected condition.

9. The interface facility of claim 8 wherein the device case has a back panel and wherein the second facility element does not protrude from the back panel.

10. The interface facility of claim 9 wherein the first and second facility elements comprise a bayonet mount.

11. The interface facility of claim 9 wherein each of the first and second facility elements includes an arcuate element concentric with the respective optical axis with which the first and second facility elements are registered.

12. The interface facility of claim 9 wherein the first facility element defines an aperture, and wherein the second facility element includes a protrusion received in the aperture when the first and second facility elements are connected.

13. The interface facility of claim 12 wherein the protrusion includes a plurality of radially extending lugs, and wherein the first facility element aperture includes lug passages associated with the lugs.

14. The interface facility of claim 9 wherein the aperture includes a circular opening with a plurality of peripheral opening extensions configured to receive a plurality of lugs on the second facility element.

15. An interface facility for connecting an ocular and a smart device having a camera, the interface facility comprising:
   a first facility element connected to the ocular;
   a device case configured to connect to the smart device; and
   a second facility element connected to the device case;
   the first and second facility elements being configured to connect to each other in a connected condition and to detach from each other;
   the first facility element being registered with a first optical axis associated with the ocular;
   the second facility element being registered with a second optical axis associated with the camera; and
   the first and second optical axes being registered with each other when the first and second facility elements are in the connected condition, such that the camera records images generated by the ocular;
   wherein the device case defines a recessed annular channel encompassing the second facility element and configured to receive a rear portion of the ocular.

16. The interface facility of claim 15 wherein the recessed annular channel extends off a peripheral edge of the device case such that a smart device with a camera close to the device edge may be employed with an ocular having a larger radius.

17. An interface facility for connecting an ocular and a smart device having a camera, the interface facility comprising:
   a first facility element connected to the ocular, wherein the first facility element includes an eyecup movable with respect to the ocular;
   a device case configured to connect to the smart device; and
   a second facility element connected to the device case, wherein the device case has a back panel and wherein the second facility element does not protrude from the back panel;
   the first and second facility elements being configured to connect to each other in a connected condition and to detach from each other;
   the first facility element being registered with a first optical axis associated with the ocular;
   the second facility element being registered with a second optical axis associated with the camera; and
   the first and second optical axes being registered with each other when the first and second facility elements are in the connected condition, such that the camera records images generated by the ocular.

18. The interface facility of claim 17 wherein the eyecup includes a latch having an engaged position and a disengaged position, and in which the eyecup is axially movable with respect to the ocular when in the disengaged position.

19. The interface facility of claim 17 wherein the eyecup has a plurality of axial positions ranging from a retracted position and an extended position.

20. The interface facility of claim 19 wherein the eyecup includes a latch facility preventing rotation of the eyecup except when in the retracted position.

\* \* \* \* \*